(No Model.)

J. F. LAWRENCE.
COFFEE AND SPICE MILL.

No. 256,225. Patented Apr. 11, 1882.

WITNESSES:
Ao. P. Grant,
W. F. Kircher

INVENTOR:
J. Franklin Lawrence,
BY John A. Wiedersheim
ATTORNEY.

UNITED STATES PATENT OFFICE.

J. FRANKLIN LAWRENCE, OF PHILADELPHIA, PENNSYLVANIA, ASSIGNOR TO JOHN LAWRENCE, OF SAME PLACE.

COFFEE AND SPICE MILL.

SPECIFICATION forming part of Letters Patent No. 256,225, dated April 11, 1882.

Application filed January 26, 1882. (No model.)

*To all whom it may concern:*

Be it known that I, J. FRANKLIN LAWRENCE, a citizen of the United States, residing in the city and county of Philadelphia, State of Pennsylvania, have invented a new and useful Improvement in Coffee and Spice Mills, which improvement is fully set forth in the following specification and accompanying drawings, in which—

Figure 1:
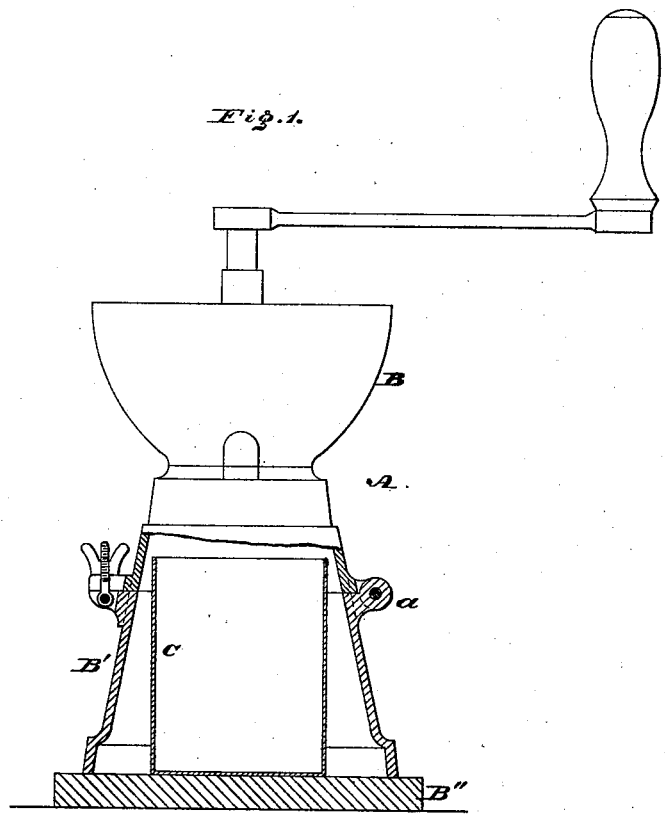
Figure 2:
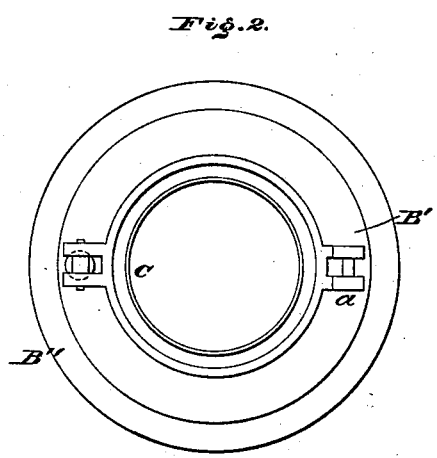

Figure 1 is a side elevation and partial vertical section of the mill embodying my invention. Fig. 2 is a top view of the base portion thereof.

Similar letters of reference indicate corresponding parts in the two figures.

My invention consists of a coffee and spice mill having a shell formed of a top part and a hollow base hinged together, the base having a closing bottom and containing a removable cup for the ground material, all as will be hereinafter fully set forth.

Referring to the drawings, A represents the shell of a mill for grinding coffee, spice, &c., formed of the top part, B, and the hollow base B', which are hinged together, as at a.

C represents a loose cup, which is placed within the base B', and rested on the bottom B'' thereof, said cup being formed of metal or other suitable material, and said bottom, which closes the base B' from below, is adapted to be secured to a table, shelf, or bracket.

It will be seen that when the parts of the mill are in position shown in Fig. 1 the cup is directly below the burr, so that the ground material falls unfailingly into the same. Furthermore, the wall of the shell below the burr incloses the cup, so that during the grinding operation the cup remains within the shell in position to catch the ground material without the liability of working out, and when the mill is being transported or carried the cup is securely retained within the shell, owing to the inclosed nature of the latter. When the ground material is required the fastening of the parts B B' of the shell is loosened and the top part, B, thrown over and back, whereby the tops of the base B' and the cup are exposed.

The cup may now be removed without lifting or shifting the base part, and its contents poured out in a most convenient manner, unlike the drawer usually employed in a mill of this class, in which the ground material is generally turned into one corner of the drawer, the operation consuming time and often causing loss of some of the material. The convenience of the cup is somewhat due to its cylindrical form, as it is thereby readily grasped, and it is preferably made of sheet metal, which is light, strong, and durable.

I am aware that it is not new in grinding-mills to attach a cup to the frame below the burr by a fastening, such as a bayonet-joint; and I am also aware that it is not new to fit a cup over the lower cylindrical part of the frame or shell; but in said mills the cups are not accessible and removable by simply throwing over the top parts of the mills, as in my case, wherefore I disclaim such features.

I am also aware that it is not new to form the shell of a grinding-mill of two parts, the top part of which is removable; and I am also aware that it is not new to provide mills with means for securing them in position, which features are also disclaimed.

Having thus described my invention, what I claim as new, and desire to secure by Letters Patent, is—

The mill having a shell formed of the hinged top part, B, and hollow base B', with the closing bottom B'', and a removable cup which is loosely fitted in said base B' and rested on said bottom B'', substantially as and for the purpose set forth.

J. FRANKLIN LAWRENCE.

Witnesses:
 JOHN A. WIEDERSHEIM,
 F. COOPER.